(12) United States Patent
Abe et al.

(10) Patent No.: US 8,355,158 B2
(45) Date of Patent: Jan. 15, 2013

(54) METHOD FOR MAP DATA OUTPUT PROCESSING, APPARATUS FOR MAP DATA OUTPUT PROCESSING, AND RECORDING MEDIUM HAVING STORED THEREIN PROGRAM FOR MAP DATA OUTPUT PROCESSING

(75) Inventors: Mihoko Abe, Sapporo (JP); Mitsuhiro Okita, Sapporo (JP); Tomohiro Saito, Sapporo (JP); Yuki Ohara, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 1034 days.

(21) Appl. No.: 11/896,451

(22) Filed: Aug. 31, 2007

(65) Prior Publication Data
US 2008/0130063 A1 Jun. 5, 2008

(30) Foreign Application Priority Data
Nov. 30, 2006 (JP) .................... 2006-322732

(51) Int. Cl.
*G06K 15/00* (2006.01)
*G06K 9/34* (2006.01)
*G06K 9/32* (2006.01)
*G06F 3/12* (2006.01)

(52) U.S. Cl. ............. 358/1.18; 358/1.15; 358/1.16; 358/1.17; 382/171; 382/173; 382/298

(58) Field of Classification Search .............. None
See application file for complete search history.

(56) References Cited

U.S. PATENT DOCUMENTS

| | | | |
|---|---|---|---|
| 2002/0051208 A1* | 5/2002 | Venable | 358/1.18 |
| 2003/0228063 A1* | 12/2003 | Nakayama et al. | 382/251 |
| 2006/0041735 A1* | 2/2006 | Hepkin | 711/206 |
| 2006/0274388 A1* | 12/2006 | Miyazawa et al. | 358/527 |
| 2007/0121163 A1* | 5/2007 | Murata et al. | 358/1.18 |
| 2008/0095470 A1* | 4/2008 | Chao et al. | 382/298 |

FOREIGN PATENT DOCUMENTS
JP  2003-274139  9/2003

* cited by examiner

*Primary Examiner* — Fan Zhang
(74) *Attorney, Agent, or Firm* — Staas & Halsey LLP

(57) ABSTRACT

A computer-implemented method of map data output processing includes the operations of: extracting a plurality of map elements satisfying a predetermined condition from a map data storage unit storing map data including map elements; determining output frames of a minimum size each covering at least one of the extracted map elements, with a fixed scaling factor for all the extracted map elements, among a plurality of types of output frames predefined to constitute an entire available output area per page alone or in combination; clipping out map areas corresponding to the determined output frames from the map data stored in the map data storage unit; and generating output data by embedding the clipped-out map areas in the entire available output area per page.

16 Claims, 23 Drawing Sheets

Fig. 3

| ELEMENT ID | FARMER'S NAME (CODE) |
|---|---|
| 100-01 | FUJI TARO |
| 105-01 | FUJI TARO |
| 105-02 | FUJI TARO |
| ⋮ | ⋮ |
| 247-01 | FUJI TARO |
| 247-02 | FUJI TARO |
| 311-01 | FUJI TARO |
| 321-01 | FUJI TARO |
| 439-01 | FUJI TARO |
| ⋮ | ⋮ |

Fig. 4

| ELEMENT ID | LLX | LLY | URX | URY |
|---|---|---|---|---|
| 100-01 | 300 | 460 | 410 | 560 |
| 105-01 | 140 | 310 | 200 | 370 |
| 105-02 | 200 | 260 | 230 | 350 |
| ⋮ | ⋮ | ⋮ | ⋮ | ⋮ |
| 247-01 | 350 | 110 | 420 | 190 |
| 247-02 | 420 | 120 | 440 | 140 |
| 311-01 | 150 | 500 | 170 | 530 |
| 321-01 | 100 | 100 | 200 | 180 |
| 439-01 | 400 | 330 | 470 | 410 |
| ⋮ | ⋮ | ⋮ | ⋮ | ⋮ |

Fig. 10

| PaperSize | POINTS | OUTPUT SIZE A (LATERAL) | OUTPUT SIZE B (LONGITUDINAL) |
|---|---|---|---|
| 0 | 8 | 22 | 32 |
| 1 | 4 | 11 | 32 |
| 2 | 2 | 11 | 16 |
| 3 | 1 | 5.5 | 16 |

Fig. 11

| STRUCTURE NUMBER | AREA (LL AND UR OF BUFFER AREA) | PaperSize | POINTS | GROUP FLAG |
|---|---|---|---|---|
| 0 | 100,100,200,180 | 3 | 1p | False |
| 1 | 220,260,230,350 | 2 | 2p | False |
| 2 | 140,310,200,370 | 2 | 2p | True |
| 3 | 350,110,420,190 | 2 | 2p | False |
| 4 | 420,120,440,140 | 2 | 2p | True |
| 5 | 400,330,470,410 | 3 | 1p | False |
| 6 | 150,500,170,530 | 3 | 1p | False |
| 7 | 300,460,410,560 | 2 | 2p | False |

Fig. 14

| PAGE NUMBER | PAGE SERIAL NUMBER | PaperSize | POINTS | STRUCTURE NUMBER |
|---|---|---|---|---|
| 1 | 0 | 2 | 2p | 1 |
| 1 | 1 | 2 | 2p | 3 |
| 1 | 2 | 2 | 2p | 7 |
| 1 | 3 | 3 | 1p | 0 |
| 1 | 4 | 3 | 1p | 5 |
| 2 | 0 | 3 | 1p | 6 |

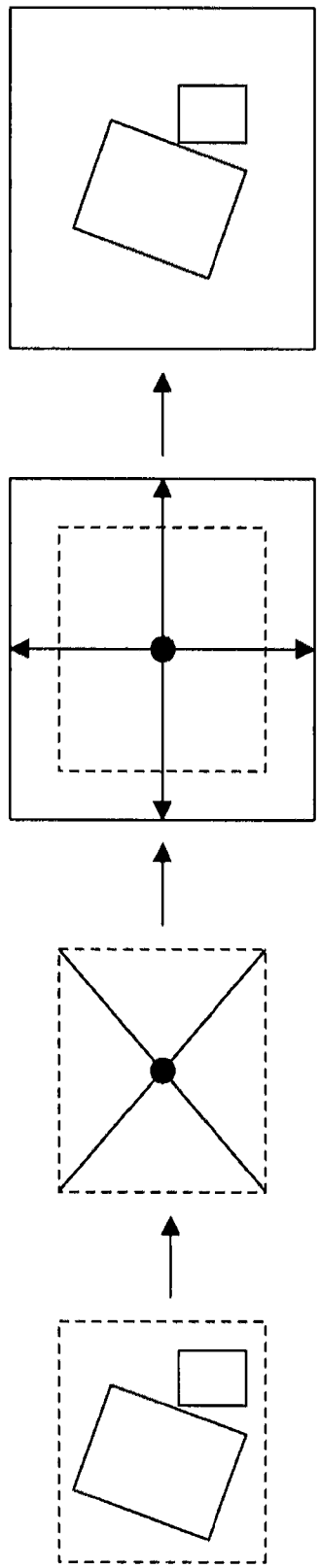

METHOD FOR MAP DATA OUTPUT PROCESSING, APPARATUS FOR MAP DATA OUTPUT PROCESSING, AND RECORDING MEDIUM HAVING STORED THEREIN PROGRAM FOR MAP DATA OUTPUT PROCESSING

BACKGROUND

1. Field

One or more embodiments of the present invention relate to a technique for outputting map data.

2. Description of the Related Art

Conventionally, for a page format with a plurality of frames for embedding maps, a print layout has been manually determined by specifying map areas to be assigned to the respective frames and the scaling factor for the maps.

Forcing the maps into the page format results in loss of flexibility in the number of maps included per page. On the other hand, removing the frames to eliminate restrictions on the area and shape of each map causes blanks between the maps and increases waste. Further, manual setting takes time and human effort.

SUMMARY

One or more embodiments of the present invention provide a technique enabling automatic layout and output of map areas that include map elements to be output.

To achieve the above and/or other aspects and advantages, embodiments of the present invention include a method of map data output processing including extracting a plurality of map elements satisfying a predetermined condition from a map data storage unit storing map data including map elements; determining output frames of a minimum size each covering at least one of the extracted map elements, with a fixed scaling factor for all the extracted map elements, among a plurality of types of output frames (e.g., FIG. 15) predefined to constitute an entire available output area per page alone or in combination; clipping out map areas corresponding to the determined output frames from the map data stored in the map data storage unit; and generating output data by embedding the clipped-out map areas in the entire available output area per page.

Additional aspects and/or advantages will be set forth in part in the description which follows and, in part, will be apparent from the description, or may be learned by practice of the invention.

These together with other aspects and advantages which will be subsequently apparent, reside in the details of construction and operation as more fully hereinafter disclosed and claimed, reference being had to the accompanying drawings forming a part hereof, wherein like numerals refer to like parts throughout.

BRIEF DESCRIPTION OF THE DRAWINGS

FIG. 3 shows an exemplary farm field information table;

FIG. 4 shows an exemplary element information table;

FIG. 10 is a table for describing definitions of PaperSize;

FIG. 11 shows an exemplary PRINTINFO table;

FIG. 14 shows an exemplary PRINTAREA table;

FIGS. 17A to D show the outline of capture generation processing;

DETAILED DESCRIPTION OF THE EMBODIMENTS

Figure 1:
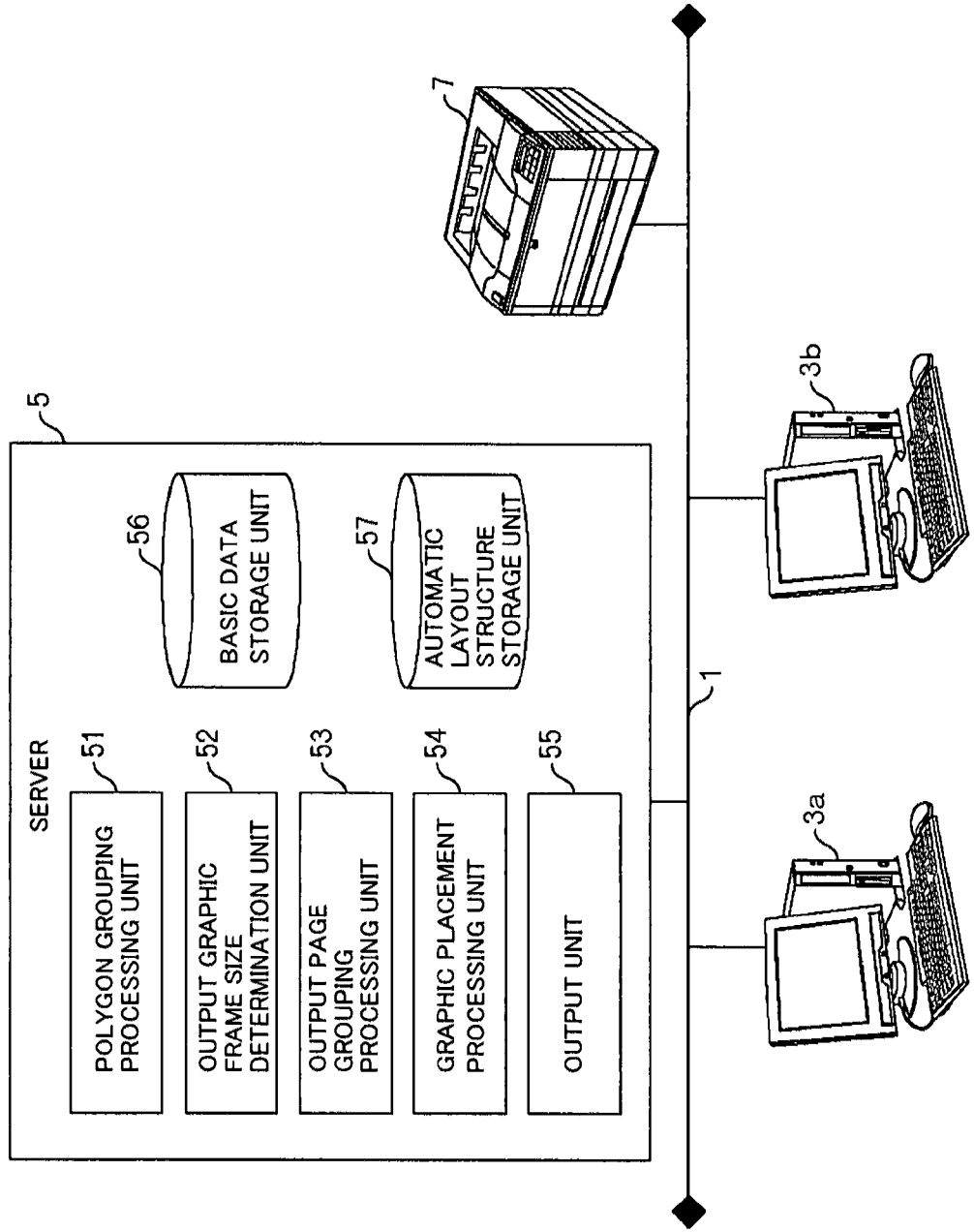
FIG. 1 is a functional block diagram in an embodiment of the present invention.

Reference will now be made in detail to embodiments, examples of which are illustrated in the accompanying drawings, wherein like reference numerals refer to the like elements throughout. Embodiments are disclosed below to explain the present invention by referring to the figures.

FIG. 1 shows an overview of a system according to an embodiment of the present invention. A server 5 that performs main processing in this embodiment, a plurality of optional user terminals 3 (in FIGS. 1, 3a and 3b), and a printer 7 are interconnected over a network 1. The server 5 includes a polygon grouping processing unit 51, an output graphic frame size determination unit 52, an output page grouping processing unit 53, a graphic placement processing unit 54, an output unit 55, a basic data storage unit 56, and an automatic layout structure storage unit 57. Operations of this system will be disclosed below according to flowcharts.

Figure 2:
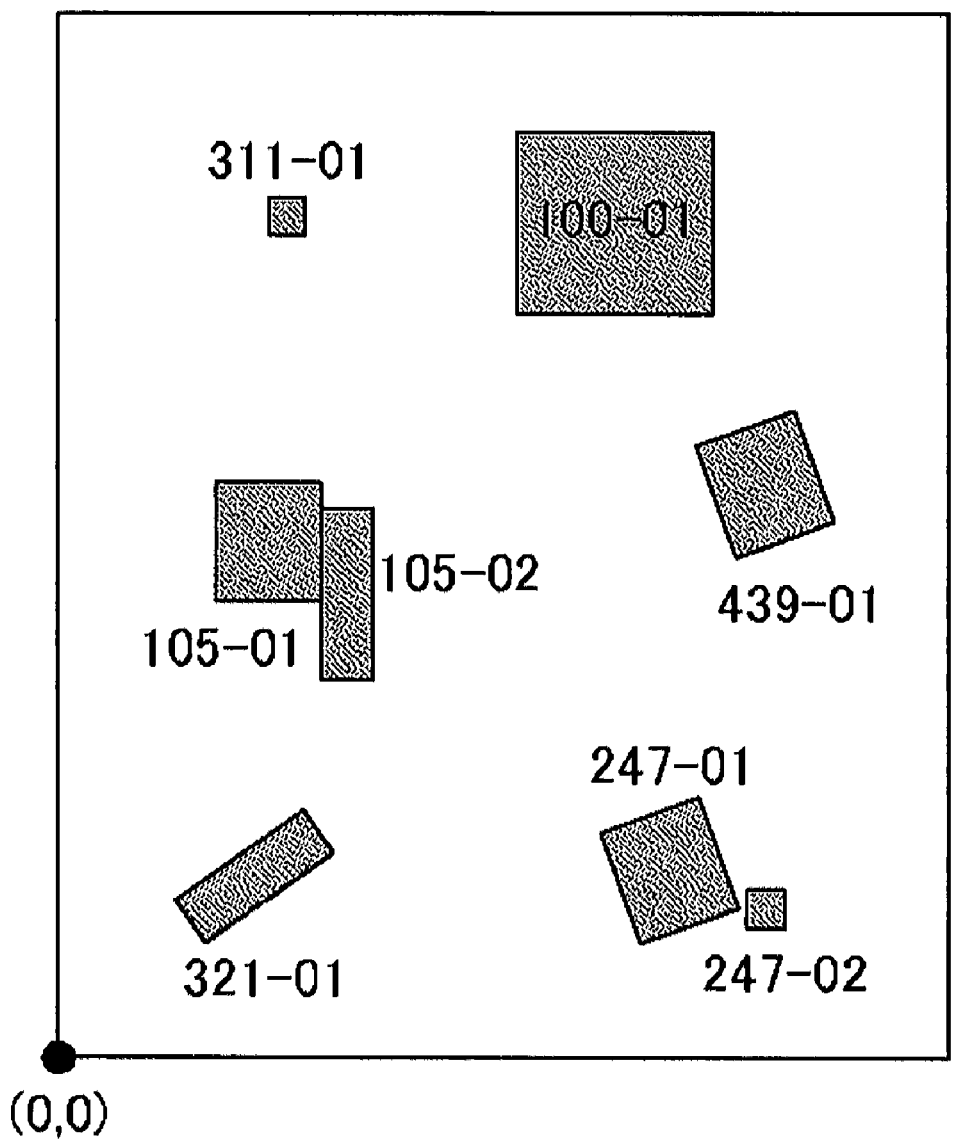
FIG. 2 shows an exemplary map.

By way of example, for processing of map data as shown in FIG. 2, data as shown in FIGS. 3 and 4 is stored in the basic data storage unit 56. In FIG. 2, the map has the origin of position coordinates set at the lower-left corner and includes eight elements. Although this embodiment illustrates an example in which the elements are farm fields, the elements are not limited to farm fields. FIG. 3 shows a farm field information table, in which the element ID and farmer's name (code) are registered. Although data items associated with element IDs are farmers in this embodiment, the data items are not limited to farmers. FIG. 4 shows an element information table, in which the element ID, LLX (the X coordinate at the lower-left corner), LLY (the Y coordinate at the lower-left corner), URX (the X coordinate at the upper-right corner), and URY (the Y coordinate at the upper-right corner) are registered.

The map data as shown in FIG. 2 is separately held in the basic data storage unit 56.

Operations of the system shown in FIG. 1 will be disclosed with reference to FIGS. 5 to 20.

Figure 5:
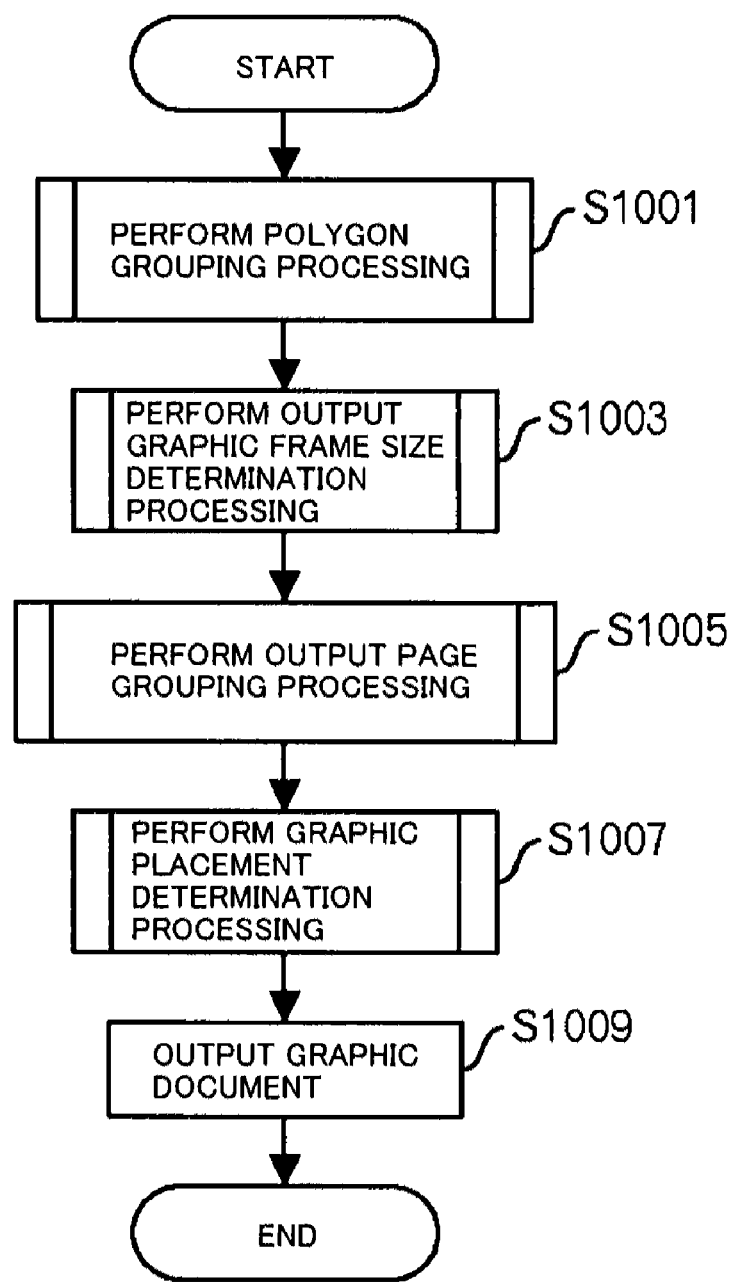
FIG. 5 shows a main processing flow in the embodiment of the present invention.

FIG. 5 shows a main processing flow in the present embodiment. The polygon grouping processing unit 51 performs polygon grouping processing (operation S1001). This processing will be disclosed in detail with reference to FIGS. 7 to 11. The output graphic frame size determination unit 52 performs output graphic frame size determination processing (operation S1003). This processing will be disclosed in detail with reference to FIG. 12. Further, the output page grouping processing unit 53 performs output page grouping processing (operation S1005). This processing will be disclosed in detail with reference to FIGS. 13 to 15. The graphic placement processing unit 54 performs graphic placement determination processing (operation S1007). This processing will be disclosed in detail with reference to FIGS. 16 to 19.

The output unit 55 outputs data of a generated graphic document to the printer 7 or the like (operation S1009). If the server 5 is implemented as a standalone computer, the graphic document may be displayed on its display device. Also in a client-server system as shown in FIG. 1, the graphic document may be displayed on a display device of a user terminal 3 requesting the output.

Figure 6:
FIG. 6 shows a print example.
Figure 7:
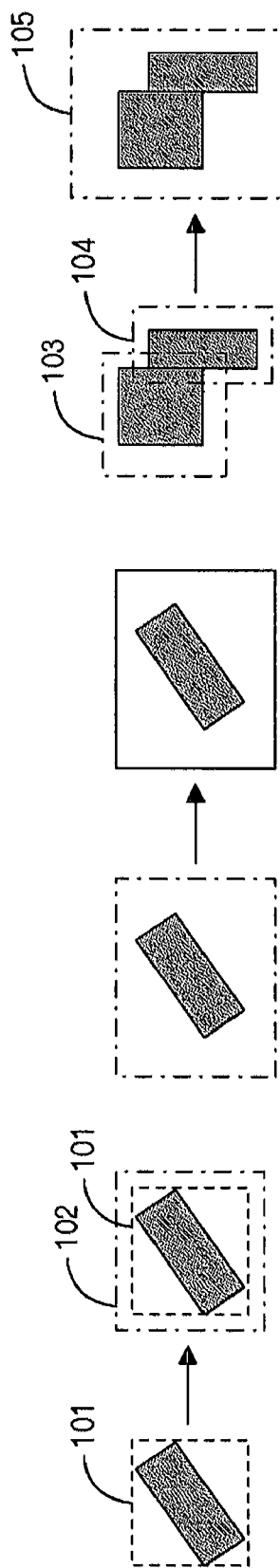
FIGS. 7A to C show the outline of polygon grouping processing.

An exemplary graphic document that is output at the printer 7 or the like through the above processing is shown in FIG. 6. In the example of a map display area of FIG. 6, the display area is divided into output frames such as the upper half, the left half of the lower half, and the halves of the right half of the lower half. In each output frame, a map including farm fields is displayed to fill up the output frame. The maps include farm fields numbered 1 to 33. Specifically, the map in the upper half shows farm fields Nos. 1 to 13 except 9 and 12. No. 9 is not intended to be output in this map. The map in the left half of the lower half shows farm fields Nos. 17 to 32. The upper map in the right half of the lower half shows farm fields Nos. 12 and 33. The lower map in the right half of the lower half shows a farm field No. 9. In this manner, farm fields adjacent to some extent are displayed together in a map clipped out with a large output frame. Farm fields that are small or concentrate in a small area are displayed in a map clipped out with an output frame matching their sizes. The same scaling factor is used for all maps to prevent a user referring to the map display area from confusion in comparing the area of the farm fields or evaluating the cultivated acreage.

The polygon grouping processing will be disclosed with reference to FIGS. 7 to 11. The outline will be disclosed with reference to FIGS. 7A to C and 8. As shown in FIG. 7A, from vertex coordinates of a polygon corresponding to a farm field to be output, the polygon grouping processing unit 51 generates a rectangle 101 covering the polygon and generates a buffer area 102 by expanding the rectangle 101 with a predetermined percentage. Then, as shown in FIG. 7B, if no other buffer areas overlap the buffer area 102, the buffer area 102 is left as an independent buffer area and subjected to processing subsequent to the polygon grouping processing unit 51. On the other hand, as shown in FIG. 7C, if a buffer area 103 of one polygon overlaps a buffer area 104 of another polygon, the polygon grouping processing unit 51 generates a new buffer area 105 covering the buffer areas 103 and 104 and performs subsequent processing.

Figure 8:
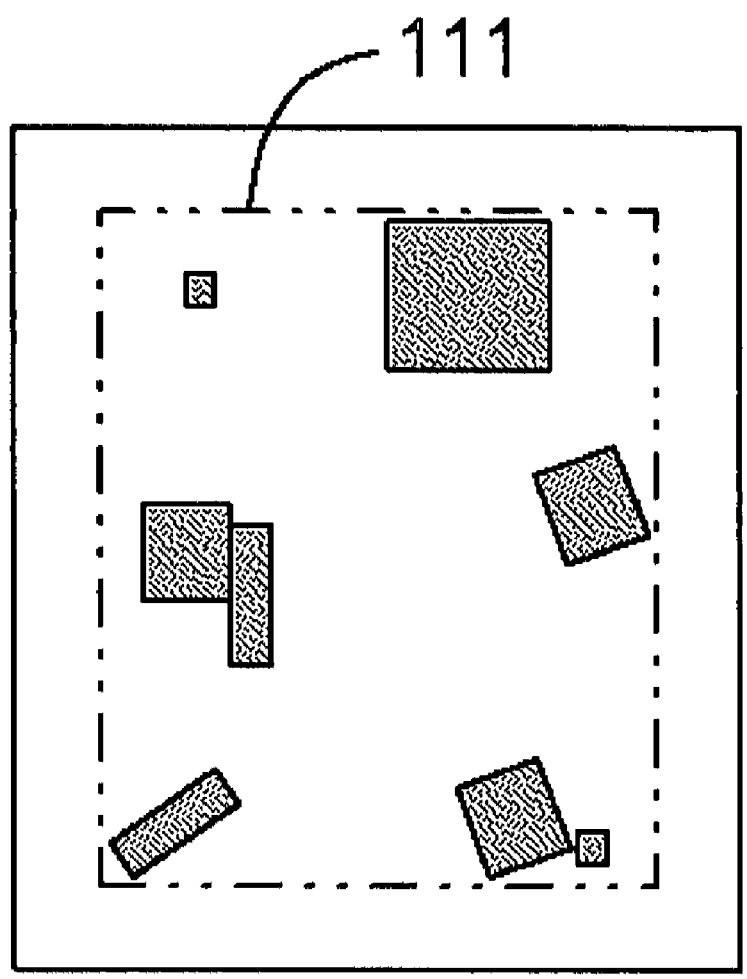
FIG. 8 shows an example in which the entire area is within one page.

The polygon grouping processing unit 51 does not need to determine overlaps between buffer areas as long as an area 111 covering all polygons to be output as shown in FIG. 8 is within the maximum printable area.

The polygon grouping processing unit 51 receives a search keyword, such as a farmer's name, from a user terminal 3 and searches the farm field information table, the element information table, and so on stored in the basic data storage unit 56. The polygon grouping processing unit 51 extracts data about objects to be output and stores the data in storage, for example main memory (operation S1 of FIG. 9A). The polygon grouping processing unit 51 then specifies and sets a default scaling factor (operation S3). Alternatively, the user may specify the scaling factor.

By using the data about the polygons to be output extracted in operation S1, the polygon grouping processing unit 51 obtains coordinate values of the entire area covering the polygons and stores the values in, for example, the main memory (operation S5). As disclosed in FIG. 8, the polygon grouping processing unit 51 reads out coordinate values of all polygons to be output, determines the minimum and maximum X coordinate values and the minimum and maximum Y coordinate values, and determines the coordinate values of the entire area (LL and UR).

The polygon grouping processing unit 51 then determines whether the determined entire area is within the size of one page (operation S7). In this embodiment, a PaperSize definition table, e.g., as in FIG. 10 may be held and data in the table may be used. Alternatively, a lesser amount of data, such as only data items for the output frame size (PaperSize) 0, may be held while the remaining data items may be determined by computation.

In the example of FIG. 10, the output frame size (PaperSize), as well as the point value to be disclosed below, output size A (lateral size), and output size B (longitudinal size) are registered. In this embodiment, the PaperSizes 0 to 3 are used and the point values are defined as 8, 4, 2, and 1. The point value is reduced by half as the PaperSize is increased by one. As to the output sizes A and B, either the longitudinal size or the lateral size is reduced by half as the PaperSize is increased by one. Specifically, the lateral size is reduced by half as the PaperSize is changed from 0 to 1 (the PaperSize is an odd number). The longitudinal size is reduced by half as the PaperSize is changed from 1 to 2 (the PaperSize is an even number). The lateral size is further reduced by half as the PaperSize is changed from 2 to 3 (the PaperSize is an odd number). Given the values for the PaperSize 0, this fixed rule enables computation of the remaining values.

If the determined entire area is within the size of one page, the polygon grouping processing unit 51 sets data into a PRINTINFO table as in FIG. 11 stored in the automatic layout structure storage unit 57. For example, the polygon grouping processing unit 51 registers the data (LL and UR) about the entire area in association with the first extracted polygon (structure number 0) and sets group flags of the other polygons to True (operation S9). After operation S9, the process returns to the initial processing via a terminal B of FIG. 9B.

FIG. 11 shows an exemplary PRINTINFO table. In the example of FIG. 11, the structure number, area (LL and UR of a buffer area, or LL and UR of a buffer area of a polygon group), PaperSize, point, and group flag are registered. By way of example, the structure number is given to all extracted polygons, each provided with one record. Four values registered for the area indicate, from left, the minimum X coordinate value, the minimum Y coordinate value (these two are the LL coordinate values), the maximum X coordinate value, and the maximum Y coordinate value (these two are the UR coordinate values). The group flag is set to False by default. In operation S9 of FIG. 9A, the polygon grouping processing unit 51 registers the LL and UR of the entire area in the record of the first polygon while setting the group flag in the record of other polygons to True to invalidate the records of the other polygons.

If the entire area is not within the size of one page, the polygon grouping processing unit 51 sets buffer areas as shown in FIG. 7A for all polygons and registers their area data (LL and UR) in the PRINTINFO table (operation S11).

The polygon grouping processing unit 51 identifies one unprocessed polygon with its group flag set to False (operation S13). For example, it identifies the polygon closest to the LL of the entire area. The process transfers to processing in FIG. 9B via a terminal A.

The polygon grouping processing unit 51 initializes a counter n to 1 (operation S15) and determines whether the buffer area of the identified polygon is within one page (operation S17). That is, it is determined whether or not the buffer area of the identified polygon is within the printable area per page defined by A0 and B0.

If it is determined that the buffer area of the identified polygon is not within the printable area per page, the polygon grouping processing unit 51 determines whether n=1 (operation S25). That is, before combining buffer areas as shown in FIG. 7C, the polygon grouping processing unit 51 determines whether the buffer area of the polygon is not within one page. If it is determined that n=1, the previously adopted scaling factor is inappropriate. Therefore, the polygon grouping processing unit 51 changes the scaling factor for further scale-down according to a predetermined rule (operation S27) and returns to the processing of operation S5 in FIG. 9A via a terminal C. The user may be prompted to specify the scaling factor.

If n≠1, then that the buffer area has become too large due to excessive buffer area combination. Therefore, the polygon grouping processing unit 51 performs processing of operation S29 and the following operations. Operation S29 will be disclosed later.

If it is determined in operation S17 that the buffer area of the identified polygon is within one page, the polygon grouping processing unit 51 determines whether the buffer area of the identified polygon overlaps other buffer areas (operation S19). If it is determined that the buffer area of the identified polygon overlaps other buffer areas as shown in FIG. 7C, the polygon grouping processing unit 51 provisionally generates a new buffer area covering the other overlapping buffer areas and stores the area data (LL and UR) about the new buffer area in storage, for example the main memory (operation S21). A history of the buffer area data is saved because the buffer area may be reset in operation S29 as disclosed later. Here, the PRINTINFO table is not updated but the data is temporarily saved. Alternatively, the PRINTINFO table may be updated while the last data is separately saved. The polygon grouping processing unit 51 then increments n by one (operation S23) and returns to the processing of operation S17. If it is determined that the buffer area of the identified polygon does not overlap any other buffer areas, the polygon grouping processing unit 51 transfers to operation S31.

In operation S29, since the buffer area has become too large due to excessive buffer area combination as mentioned above, the polygon grouping processing unit 51 resets the provisionally set last buffer area and validates the data about the buffer area preceding the last buffer area (operation S29).

After operation S29, or if it is determined in operation S19 that no other buffer areas overlap, the polygon grouping processing unit 51 registers the data (LL and UR) about the resulting buffer area in the PRINTINFO table in association with the identified polygon (operation S31). At this point, if buffer areas have been combined with the identified polygon, the polygon grouping processing unit 51 sets the group flag of the combined polygons (structure numbers) to True. That is, if buffer areas have been combined together, the data about the combined buffer areas is registered in association with one polygon while the records of polygons corresponding to the other buffer areas are invalidated.

Figure 9A:
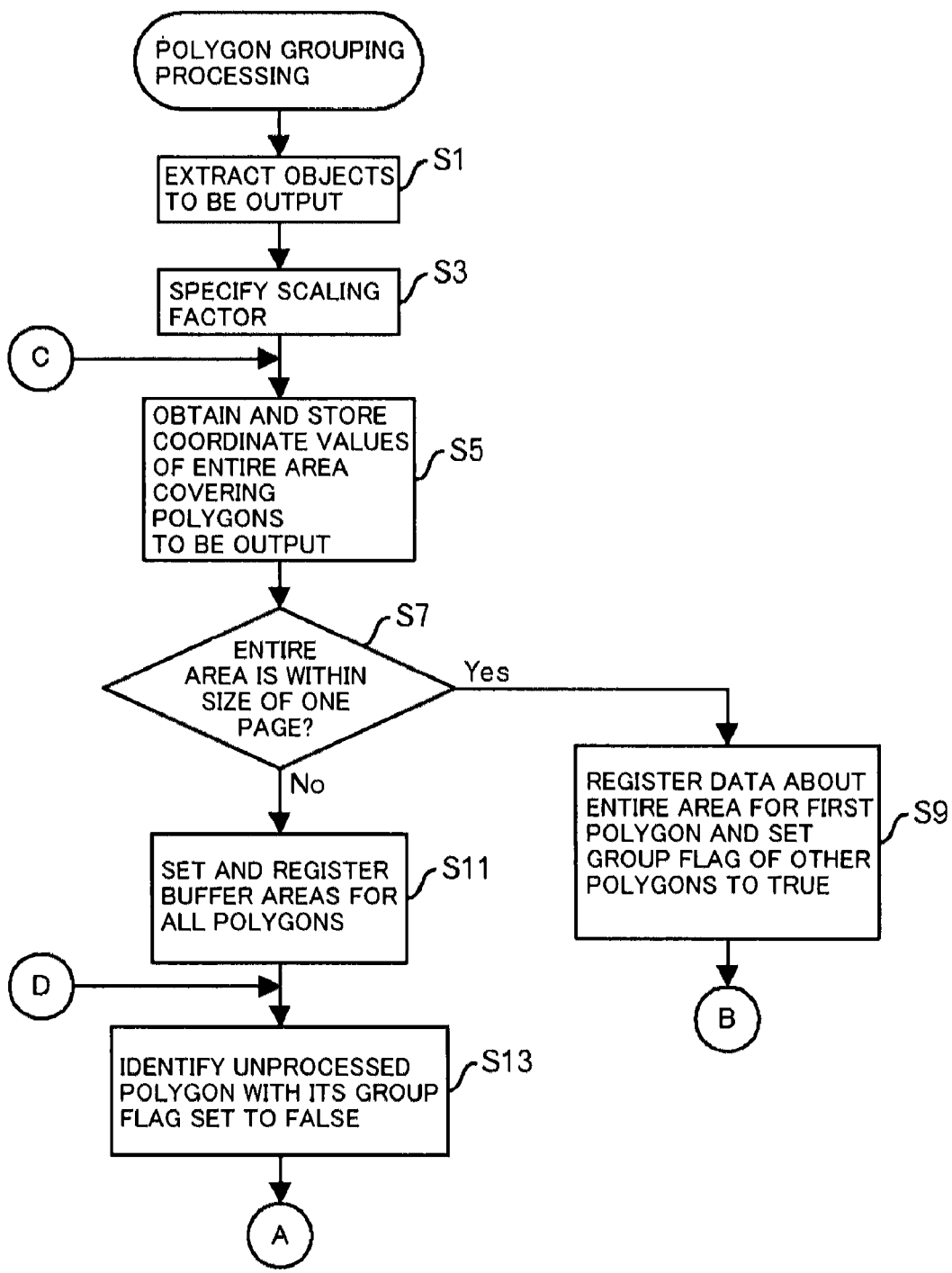
FIG. 9A shows a first part of a processing flow of the polygon grouping processing.
Figure 9B:
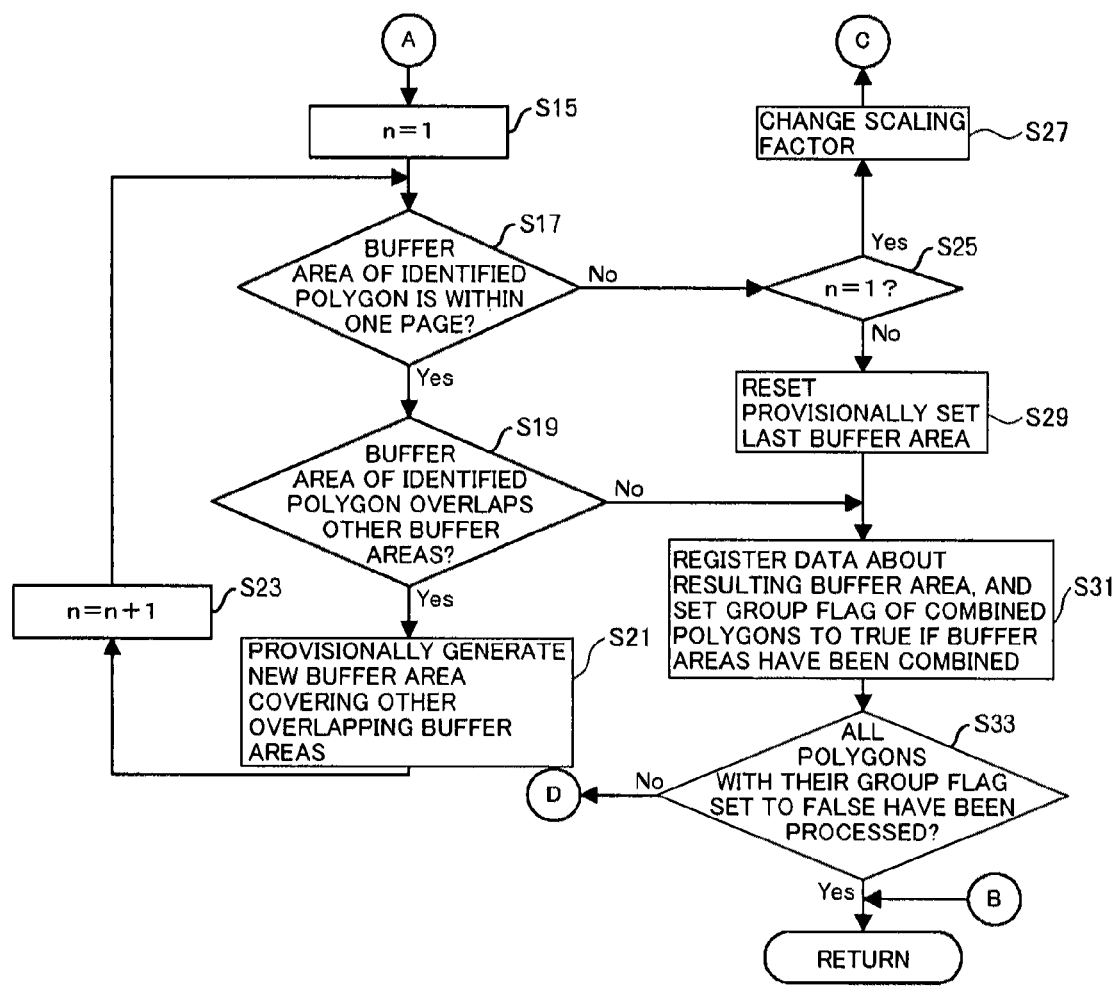
FIG. 9B shows a second part of the processing flow of the polygon grouping processing.

The polygon grouping processing unit 51 then determines whether all polygons with their group flag set to False have been processed (operation S33) and, if there is an unprocessed polygon, returns to operation S13 in FIG. 9A via a terminal D. If all polygons with their group flag set to False have been processed, the polygon grouping processing unit 51 returns to the initial processing.

By performing the above processing, the polygon grouping processing unit 51 can combine buffer areas of as many adjacent polygons as one page can include and set them to be collectively output. Since dividing the original map into too many portions would obfuscate the relationship among them, they are combined as much as possible.

Figure 12:
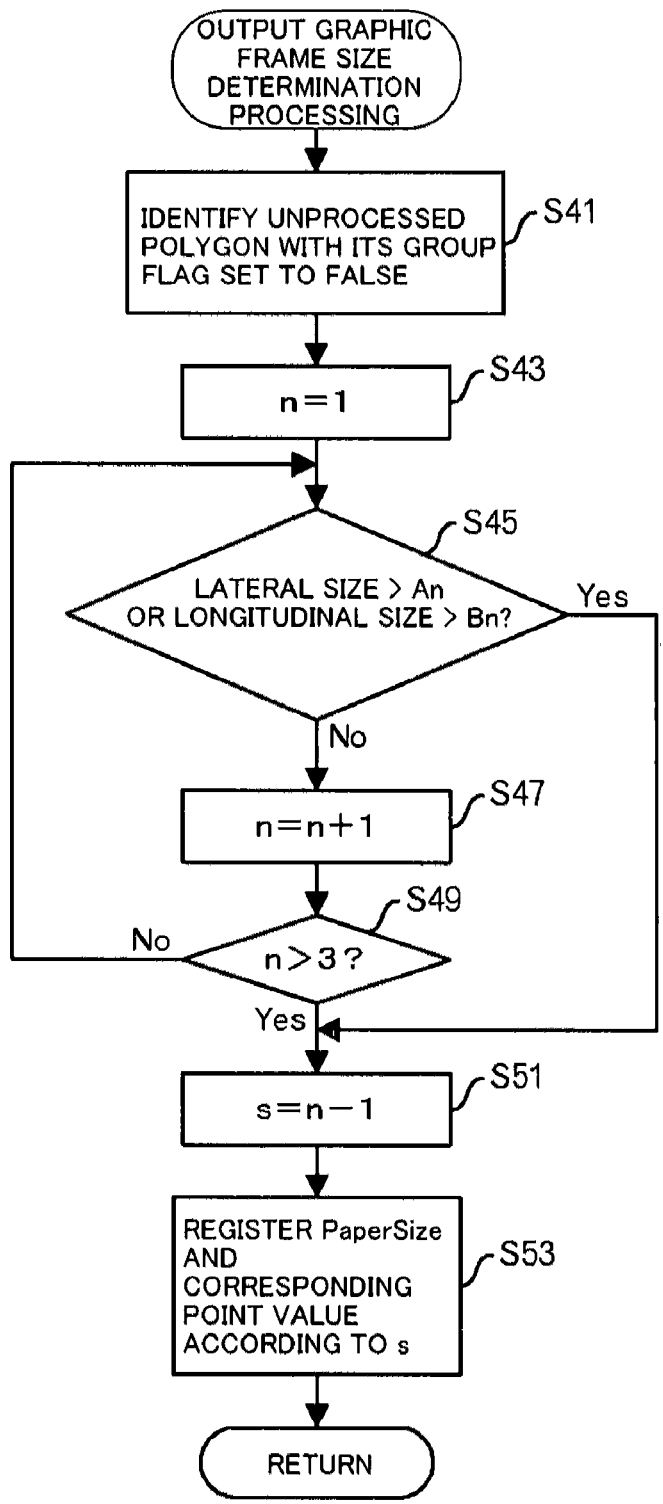
FIG. 12 shows a processing flow of output graphic frame size determination processing.

The output graphic frame size determination processing will be disclosed with reference to FIG. 12. The output graphic frame size determination unit 52 identifies an unprocessed polygon with its group flag set to False in the PRINTINFO table (operation S41). The output graphic frame size determination unit 52 also initializes the counter n, i.e., the PaperSize counter, to 1 (operation S43).

The output graphic frame size determination unit 52 determines whether the buffer area of the identified polygon has a lateral size larger than An obtained from the PaperSize definition table, e.g., as in FIG. 10, or a longitudinal size larger than Bn (operation S45). The suffix n of An or Bn denotes the current counter value. For example, when the counter n=1, it is A1 or B1, that is, the value of the output size A or B for the PaperSize 1 in the PaperSize definition table of FIG. 10. Since it has been determined in the polygon grouping processing whether or not the buffer area is within A0 and B0 (the output size for the PaperSize 0) representing the size of one page, determination in this processing is made starting from the size that is one size smaller.

If it is determined that the buffer area of the identified polygon has a lateral size larger than An or a longitudinal size larger than Bn (operation S45), the output graphic frame size determination unit 52 sets a variable s representing the PaperSize to n−1 (operation S51).

If the buffer area of the identified polygon has a lateral size smaller than An and a longitudinal size smaller than Bn (operation S45), the output graphic frame size determination unit 52 increments n by one (operation S47). It is determined whether n exceeds 3 (operation S49). If n is less than 3, the output graphic frame size determination unit 52 returns to the processing of operation S45. Although the present embodiment processes up to 3, this number may be changed to adapt to other division modes.

The PaperSize and a corresponding point value are registered in the PRINTINFO table according to s (operation S53). The point value may be obtained from the PaperSize definition table as in FIG. 10.

In this manner, the size of an appropriate output frame is determined for each polygon.

Figure 13:
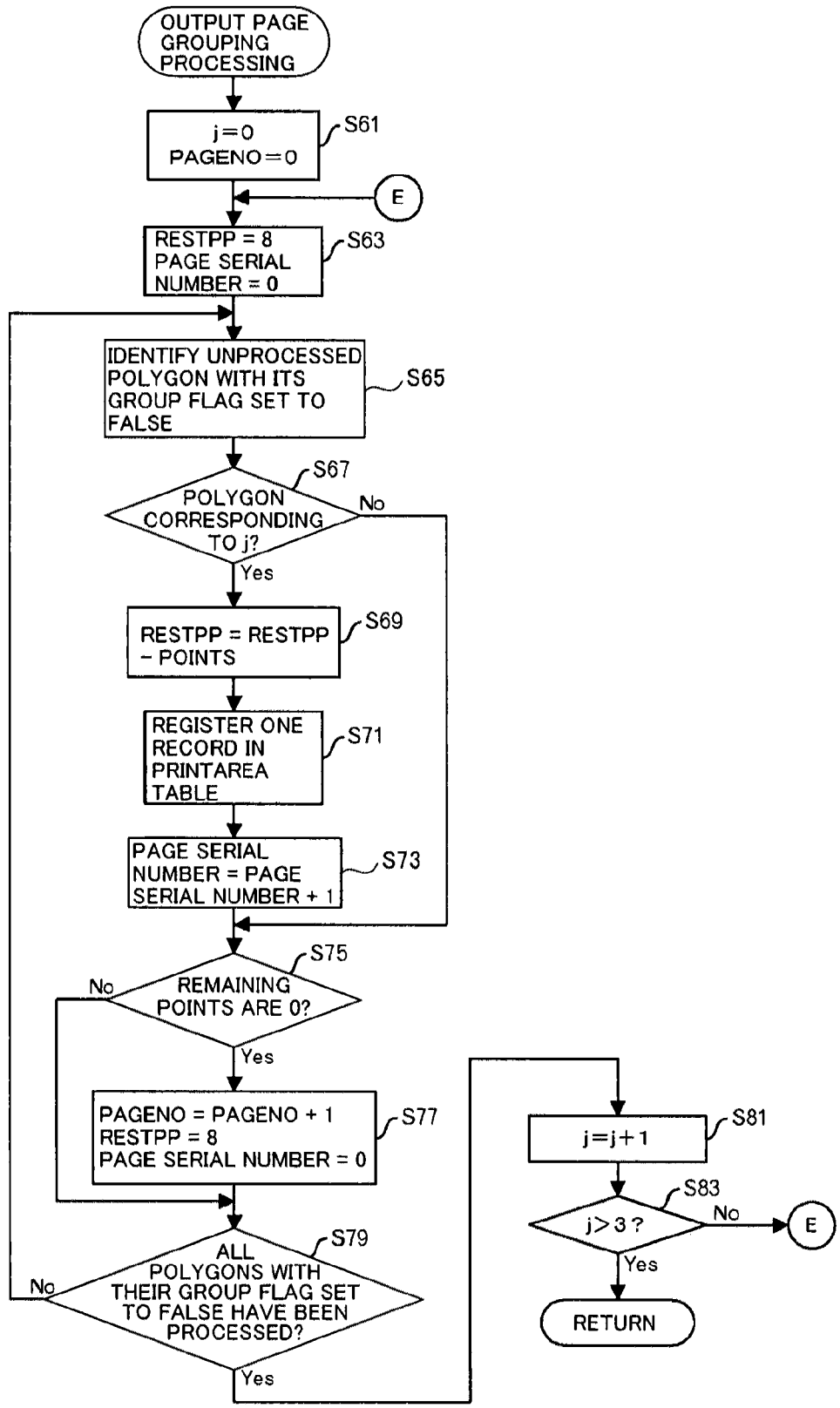
FIG. 13 shows a processing flow of output page grouping processing.

The output page grouping processing will be disclosed with reference to FIG. 13. The output page grouping processing unit 53 first initializes a counter j representing the size to 0 and initializes a variable PAGENO representing the page number to 1 (operation S61). It is assumed that j=0 corresponds to a point value 8, j=1 corresponds to a point value 4, j=2 corresponds to a point value 2, and j=3 corresponds to a point value 1. That is, the output page grouping processing unit 53 processes polygons in order of decreasing size. By processing in order of decreasing size, the output page grouping processing unit 53 can eliminate blanks in a page and place maps without wasting the space. The output page grouping processing unit 53 also initializes a variable RESTPP for managing the remaining points to 8 and initializes the page serial number to 0 (operation S63).

The output page grouping processing unit 53 identifies one unprocessed polygon with its group flag set to False in the PRINTINFO table (operation S65). The output page grouping processing unit 53 determines whether the identified polygon is a polygon corresponding to the size j (operation S67). If it is not a polygon corresponding to the size j, the output page grouping processing unit 53 transfers to operation S75. If it is a polygon corresponding to the size j, the output page grouping processing unit 53 updates the RESTPP to (RESTPP−points) (operation S69). The output page grouping processing unit 53 registers one record for the polygon corresponding to the size j in a PRINTAREA table in the automatic layout structure storage unit 57 (operation S71).

FIG. 14 shows an exemplary PRINTAREA table. In the example of FIG. 14, the page number, page serial number, PaperSize, point value, and structure number identifying a polygon are registered. Values of the variable PAGENO are registered in the column of the page number. Current page serial numbers are registered in the column of the page serial number. Further, for the point value and the structure number, relevant values for polygons (structure numbers) corresponding to the size j are copied from the PRINTINFO table.

The output page grouping processing unit 53 then increments the page serial number by one (operation S73). The output page grouping processing unit 53 determines whether the variable RESTPP for managing the remaining points is 0 (operation S75). If the RESTPP is not 0, the output page grouping processing unit 53 transfers to operation S79. If the RESTPP is 0, the output page grouping processing unit 53 increments the variable PAGENO by one, initializes the RESTPP to 8, and further initializes the page serial number to 0 (operation S77).

The output page grouping processing unit 53 then determines whether all polygons with their group flag set to False have been processed (operation S79). If there is an unprocessed polygon with its group flag set to False, the output page grouping processing unit 53 returns to operation S65. If all polygons with their group flag set to False have been processed, the output page grouping processing unit 53 increments j by one (operation S81). The output page grouping processing unit 53 determines whether j exceeds 3 (operation S83) and, if not, returns to operation S63 via a terminal E. Otherwise, it returns to the initial processing.

Figure 15:
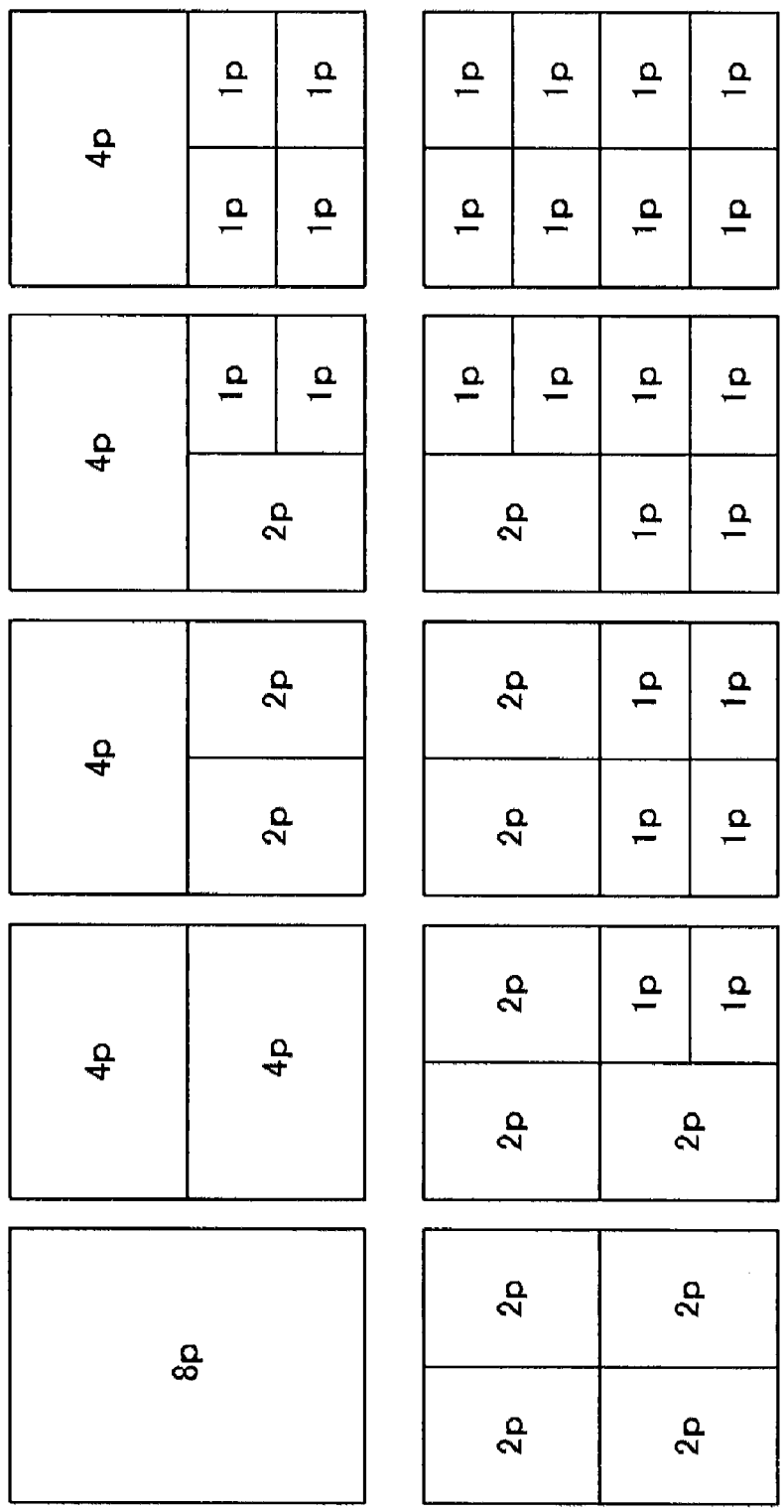
FIG. 15 shows exemplary combinations of output frames.

By performing the above processing, the output page grouping processing unit 53 determines a polygon combination in each page. Here, since the combination processing is performed in order of decreasing size, and the sizes of the output frames are appropriately predefined, the map display area in each output page will not have blanks, nor will it overflow. That is, in this embodiment, only ten patterns of page layout as shown in FIG. 15 exist, so that the polygon combination is automatically determined as any one of these patterns.

The graphic placement determination processing will be disclosed with reference to FIGS. 16 to 19. The graphic placement processing unit 54 first initializes the variable PAGENO for managing the page number to 1 (operation S91). The graphic placement processing unit 54 also sets initial values for coordinates STARTPOINT (X, Y) of a reference point at the upper-left corner where a map is to be placed (operation S93). Specifically, (0, 0) are set. Further, the graphic placement processing unit 54 sets a position flag, which indicates whether the processing is being performed for the upper layer or the lower layer of the printable area, to True as an initial state (operation S95). True represents the upper layer and False represents the lower layer.

The graphic placement processing unit 54 then refers to the PAGEAREA table as in FIG. 14 to identify one unprocessed polygon corresponding to the PAGENO (operation S97). The graphic placement processing unit 54 performs processing of generating a capture for the identified polygon (operation S99).

The capture generation processing will be disclosed with reference to FIGS. 17A to D and 18.

Figure 18:
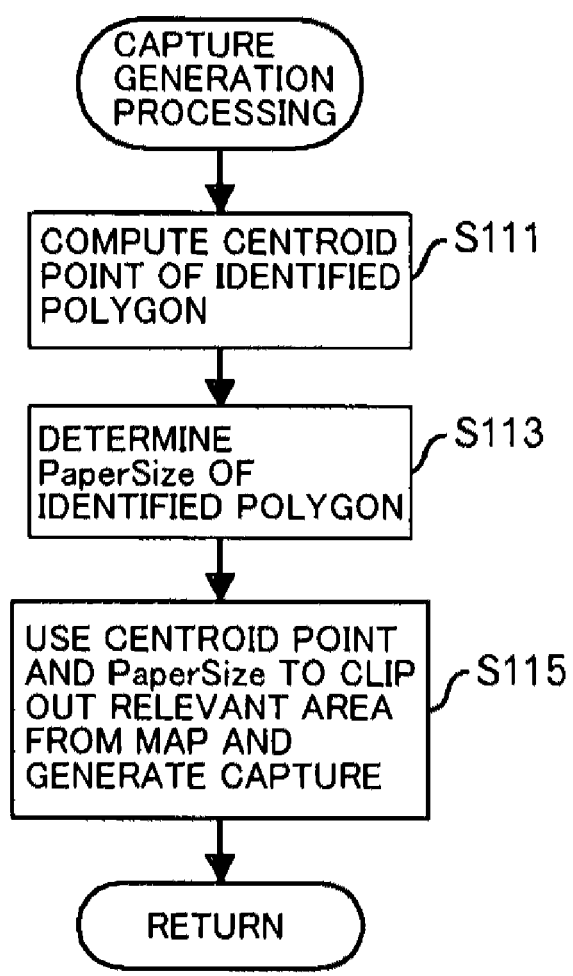
FIG. 18 shows a processing flow of the capture generation processing.

For a buffer area of the identified polygon determined as shown in FIG. 17A, the graphic placement processing unit 54 uses the area data (LL and UR) in the PRINTINFO table as in FIG. 11 to compute the coordinate values of the centroid point of the buffer area as shown in FIG. 17B and stores the area data in storage, for example the main memory (FIG. 18, operation S111). The graphic placement processing unit 54 determines the PaperSize of the identified polygon from the PRINTINFO table (operation S113). Then, as shown in FIG. 17C, with reference to the computed centroid point, the graphic placement processing unit 54 obtains the lateral and longitudinal lengths according to the PaperSize set for the polygon (e.g., obtains the lengths from the PaperSize definition table in FIG. 10) to compute vertex coordinates (LL and UR). As shown in FIG. 17D, the graphic placement processing unit 54 uses the vertex coordinates to clip out a relevant area from map data stored in the basic data storage unit 56, and generates a capture (operation S115). The generated capture is stored in storage, for example the main memory.

Figure 16A:
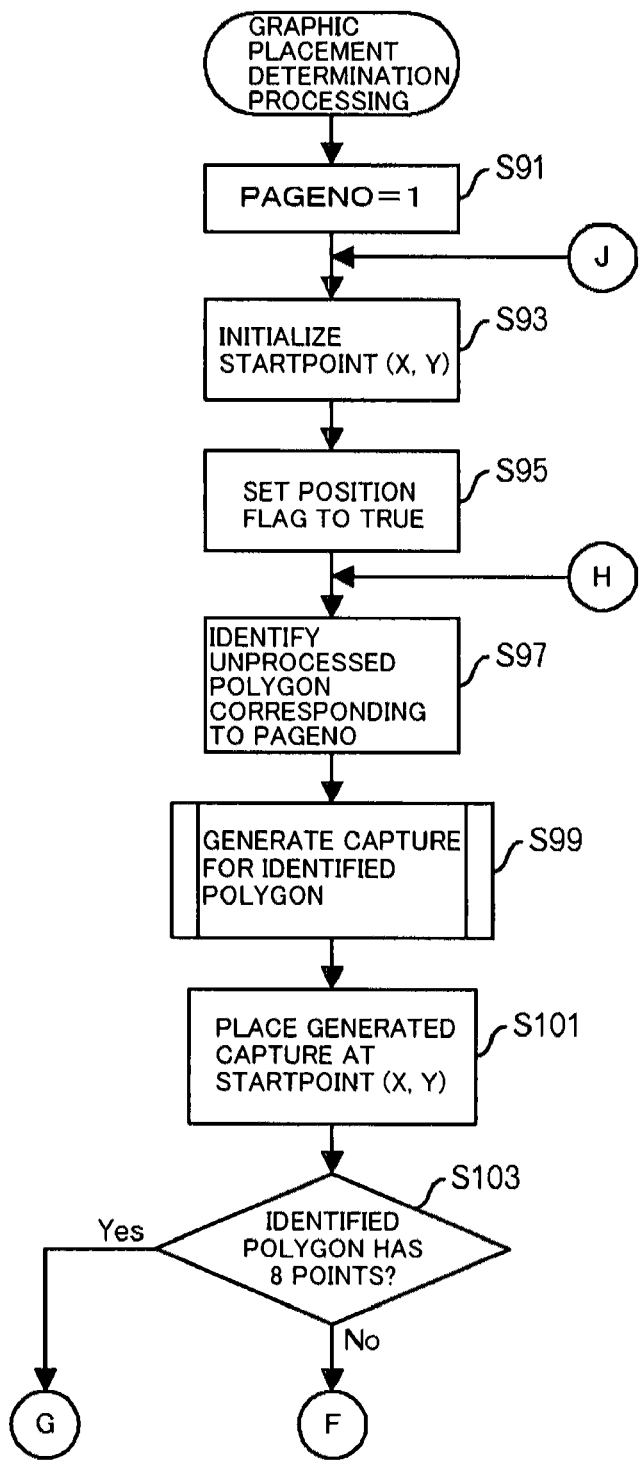
FIG. 16A shows a first part of a processing flow of graphic placement determination processing.
Figure 19D:
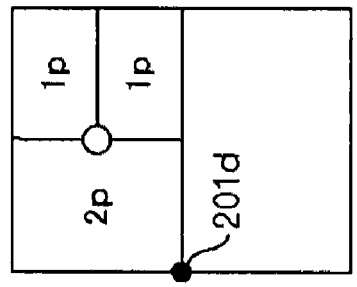
FIGS. 19A to D are diagrams for describing the outline of the graphic placement determination processing.
Figure 19C:
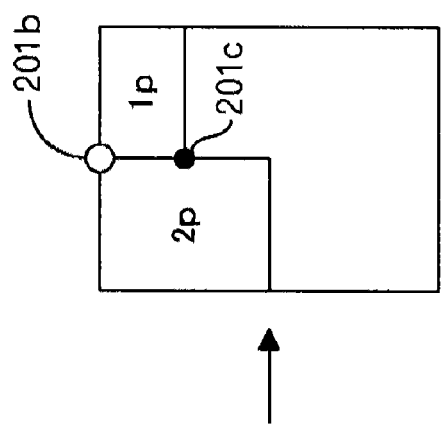
Figure 19B:
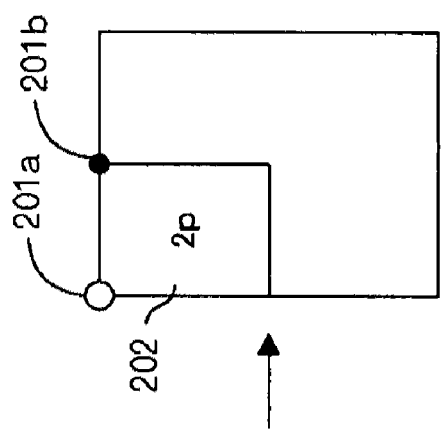
Figure 19A:
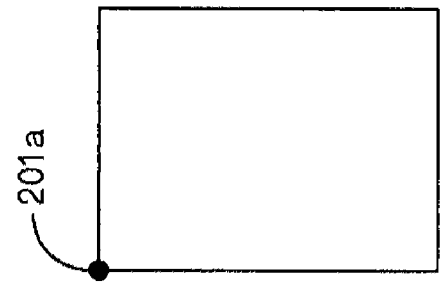

Returning to the description of FIG. 16A, the graphic placement processing unit 54 places the generated capture at the STARTPOINT (X, Y) (operation S101). That is, the graphic placement processing unit 54 places the upper-left vertex of the generated capture at the STARTPOINT (X, Y). The STARTPOINT (X, Y) is initially set at the upper-left point 201*a* in the printable area as shown in FIG. 19A, and the upper-left vertex of the capture 202 is placed to coincide with the point 201*a* as shown in FIG. 19B.

The graphic placement processing unit 54 refers to the PRINTINFO table as in FIG. 11 to determine whether the points of the polygon identified in operation S97 are 8 (operation S103). If the points of the identified polygon are 8, this polygon alone will constitute one page and therefore updating of the STARTPOINT (X, Y) to be disclosed below is not necessary. Thus, if the points of the identified polygon are 8, the graphic placement processing unit 54 transfers to processing in FIG. 16C via a terminal G. If the points of the identified polygon are not 8, the graphic placement processing unit 54 transfers to processing in FIG. 16B via a terminal F.

Figure 16B:
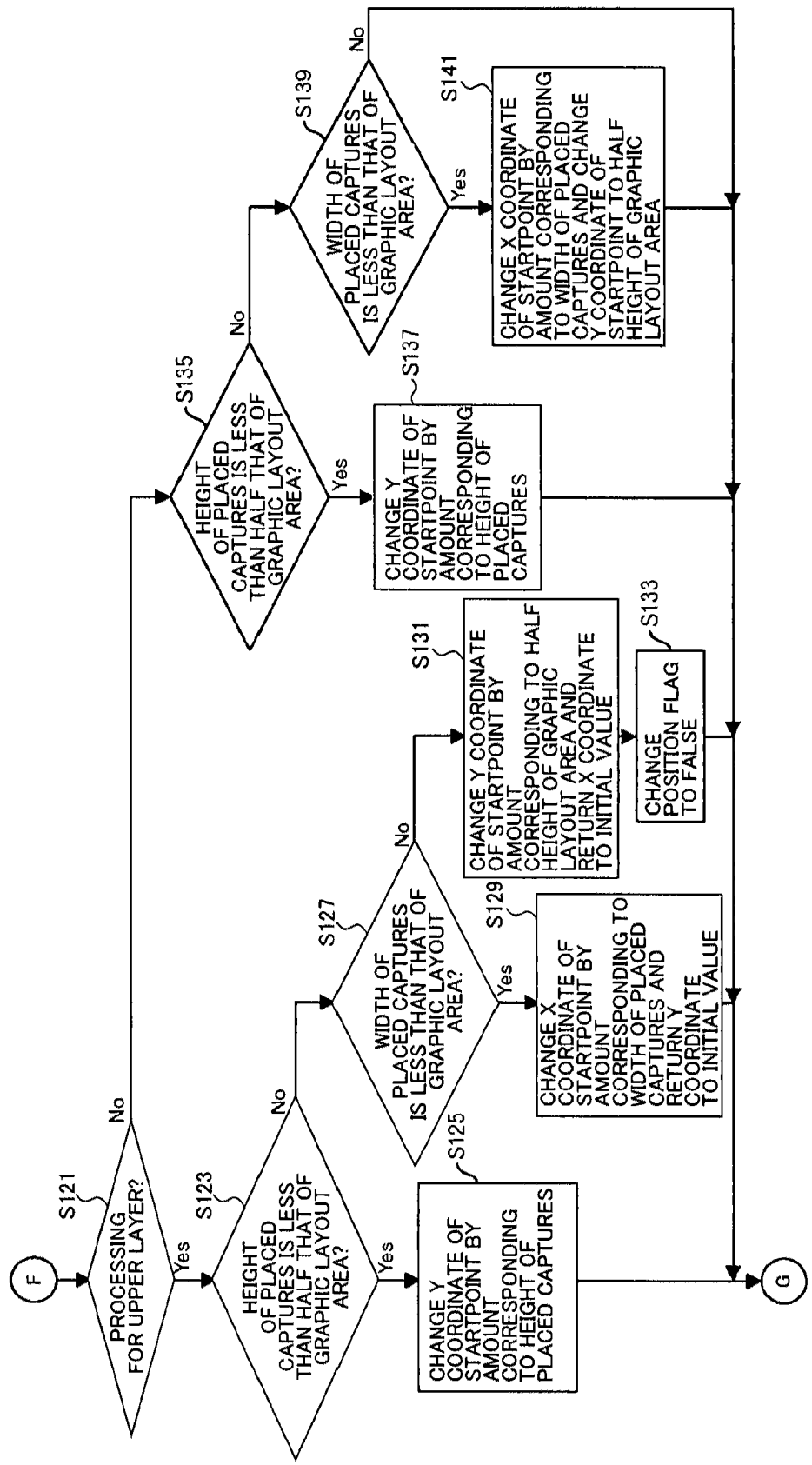
FIG. 16B shows a second part of the processing flow of the graphic placement determination processing.

Turning to description of the processing in FIG. 16B, the graphic placement processing unit 54 first checks the position flag to determine whether the processing is for the upper layer (operation S121). If the position flag is True and the processing is for the upper layer, the graphic placement processing unit 54 determines whether the height (determined as the height of the narrowest portion) of placed captures is less than half that of the graphic layout area (i.e., the printable area) (operation S123). If the points of polygons involved in the placed captures are 2 or 4 in total, the height is not less than half that of the graphic layout area. If the points of the polygons involved in the placed captures are 1 or 3, the height is less than half that of the graphic layout area.

If the height of the placed captures is less than half that of the graphic layout area, the graphic placement processing unit 54 changes the Y coordinate of the STARTPOINT by the amount corresponding to the height of the placed captures (operation S125). The graphic placement processing unit 54 transfers to the processing in FIG. 16C via the terminal G. As shown in FIG. 19C, since the height of the placed captures is less than half that of the graphic layout area on the right side of the upper half, the Y coordinate of the STARTPOINT is changed by the amount corresponding to the height of the placed captures to move the STARTPOINT to a point 201c in operation S125.

If the height of the placed captures is not less than half that of the graphic layout area, the graphic placement processing unit 54 determines whether the width of the placed captures is less than that of the graphic layout area (operation S127). If the points of the polygons involved in the placed captures are 2 in total, the width is less than half that of the graphic layout area. If the points of the polygons involved in the placed captures are 4, the width is not less than half that of the placement area. In the example shown in FIG. 19B, it is determined in operation S127 that the width is less than that of the graphic layout area because a capture involving polygons of 2 points is placed. In such a case, the graphic placement processing unit 54 changes the X coordinate of the START-POINT by the amount corresponding to the width of the placed captures and returns the Y coordinate to the initial value (operation S129). That is, a point 201b is set as the STARTPOINT in FIG. 19B. The graphic placement processing unit 54 transfers to the processing in FIG. 16C via the terminal G.

If the width is not less than that of the graphic layout area, the graphic placement processing unit 54 changes the Y coordinate of the STARTPOINT by the amount corresponding to half the height of the graphic layout area and returns the X coordinate to the initial value (operation S131). It further changes the position flag to False to proceed to processing for the lower layer (operation S133). The graphic placement processing unit 54 transfers to the processing in FIG. 16C via the terminal G. As shown in FIG. 19D, the STARTPOINT is changed to a point 201d.

If it is determined in operation S121 that the position flag is False and the processing is for the lower layer, the graphic placement processing unit 54 determines whether the height (determined as the height of the narrowest portion) of placed captures in the lower layer is less than half that of the graphic layout area (operation S135). If the points of polygons involved in the placed captures are 6 or 8 in total, the height is not less than half that of the graphic layout area. If the points of the polygons involved in the placed captures are 5 or 7, the height in the lower layer is less than half that of the graphic layout area.

If the height of the placed captures in the lower layer is less than half that of the graphic layout area, the graphic placement processing unit 54 changes the Y coordinate of the STARTPOINT by the amount corresponding to the height of the placed captures (operation S137). The graphic placement processing unit 54 transfers to the processing in FIG. 16C via the terminal G.

If the height of the placed captures in the lower layer is not less than half that of the graphic layout area, the graphic placement processing unit 54 determines whether the width of the placed captures is less than that of the graphic layout area (operation S139). If the points of the polygons involved in the placed captures are 6 in total, the width in the lower layer is less than half the width of the graphic layout area. If the point of the polygons involved in the placed captures are 8, the width is not less than half that of the graphic layout area. If it is determined that the width in the lower layer is less than that of the graphic layout area, the graphic placement processing unit 54 changes the X coordinate of the START-POINT by the amount corresponding to the width of the placed captures and changes the Y coordinate of the START-POINT to half the height of the graphic layout area (operation S141). The graphic placement processing unit 54 transfers to the processing in FIG. 16C via the terminal G.

Figure 16C:
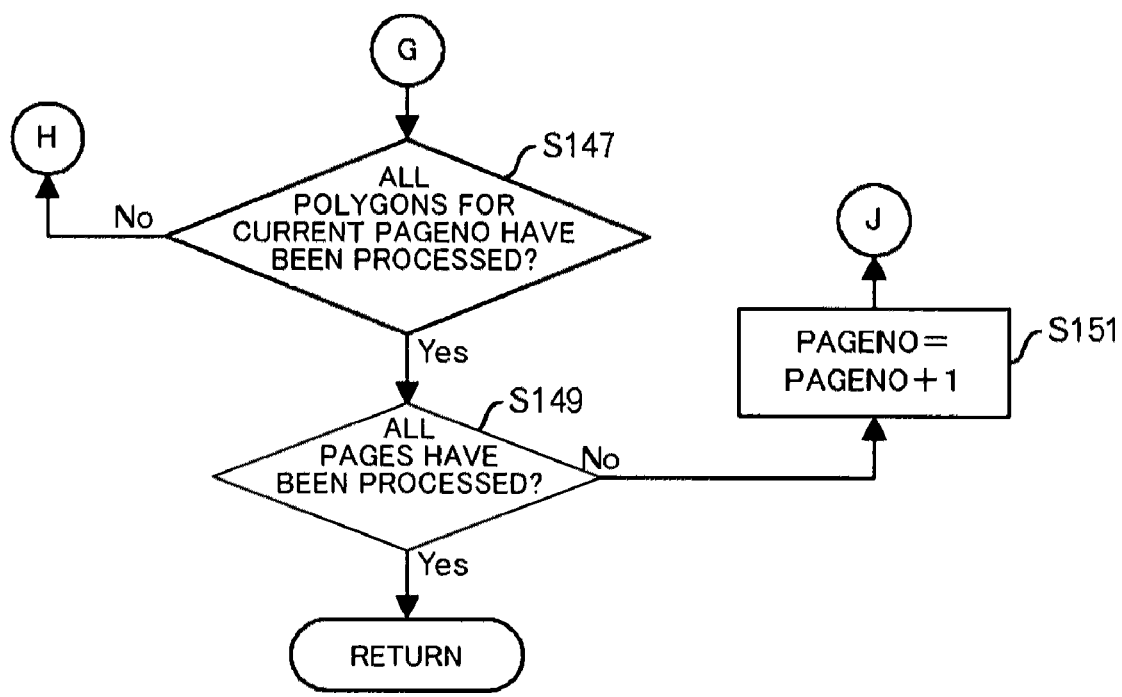
FIG. 16C shows a third part of the processing flow of the graphic placement determination processing.

If the width is not less than that of the graphic layout area, the graphic placement processing unit 54 transfers to the processing in FIG. 16C via the terminal G.

Turning to description of FIG. 16C, the graphic placement processing unit 54 determines whether all polygons for the current PAGENO have been processed (operation S147). If there is an unprocessed polygon for the current PAGENO, the graphic placement processing unit 54 returns to operation S97 in FIG. 16A via a terminal H. If all polygons for the current PAGENO have been processed, the graphic placement processing unit 54 refers to the PRINTAREA table to determine whether all pages have been processed (operation S149). If all pages have been processed, the graphic placement processing unit 54 returns to the initial processing. If there is an unprocessed page, the graphic placement processing unit 54 increments the PAGENO by one (operation S151) and returns to operation S93 in FIG. 16A via a terminal J.

By performing the above processing, captures can be placed at appropriate positions. That is, print data can be generated in which partial data portions of the map are placed with no space left.

Thus, the embodiment of the present invention has been disclosed. However, the present invention is not limited to the disclosed embodiment. For example, the functional block diagram shown in FIG. 1 is an example and not necessarily match an actual program module configuration.

Variations of the processing flows are also possible as long as similar functions can be implemented.

Further, any data structures may be adopted for the table configurations as long as similar data can be managed.

Figure 20:
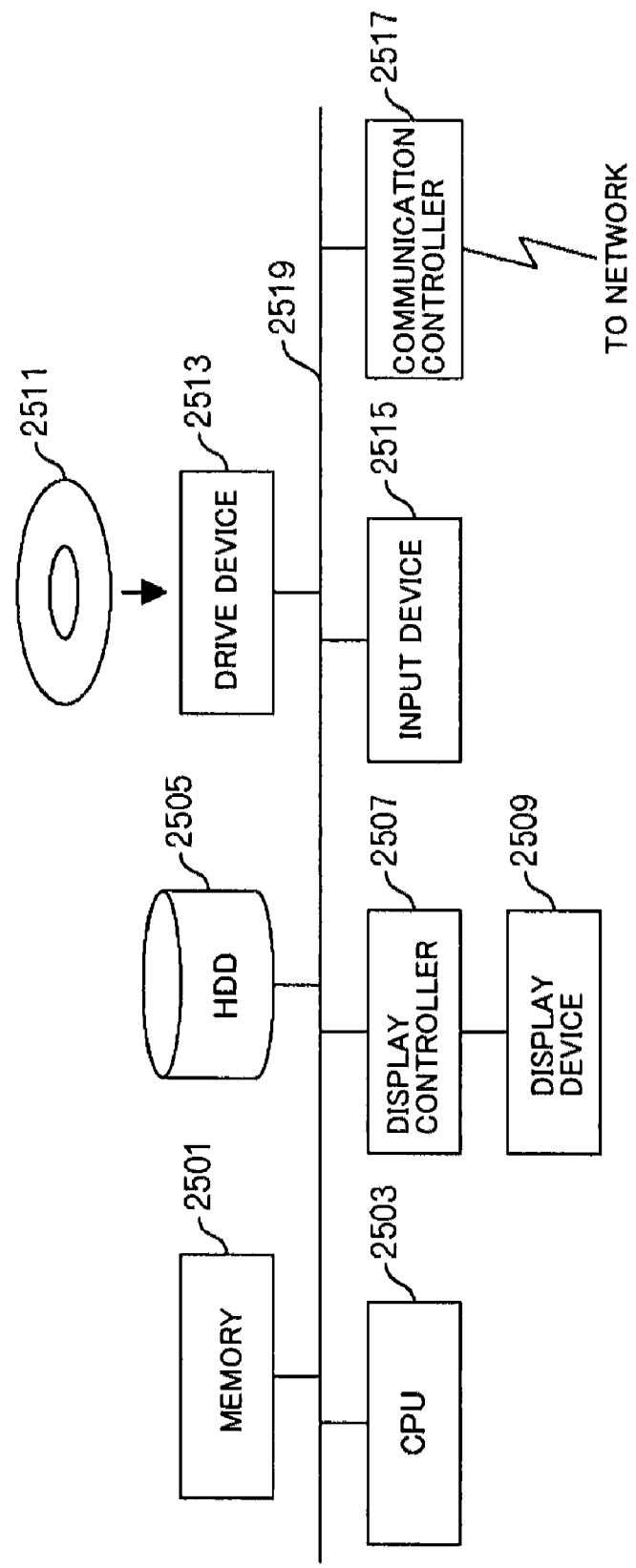
FIG. 20 is a functional block diagram of a computer.

The server 5 and the user terminals 3 may be computer apparatuses for example, in which memory 2501 (storage), a CPU 2503 (processor), a hard disk drive (HDD) 2505, a display controller 2507 connected to a display device 2509, a drive device 2513 for a removable disk 2511, an input device 2515, and a communication controller 2517 for connecting to a network are interconnected via a bus 2519 as shown in FIG. 20. An operating system (OS) and application programs including a web browser are stored in the HDD 2505, and read out from the HDD 2505 to the memory 2501 when executed by the CPU 2503. As necessary, the CPU 2503 controls the display controller 2507, the communication controller 2517, and the drive device 2513 to cause them to perform required operations. Data being processed is stored in the memory 2501, and stored in the HDD 2505 as necessary. Such computers implement various functions as disclosed above with organic cooperation of hardware such as the above-disclosed CPU 2503 and memory 2501 with the OS and required application programs.

In addition to the above disclosed embodiments, embodiments of the present invention can also be implemented through computer readable code/instructions in/on a medium, e.g., a computer readable medium, to control at least one processing element to implement any above disclosed embodiment. The medium can correspond to any medium/media permitting the storing and/or transmission of the computer readable code.

The system also includes permanent or removable storage, such as magnetic and optical discs, RAM, ROM, etc. on which the process and data structures of the present invention can be stored and distributed. The processes can also be distributed via, for example, downloading over a network such as the Internet.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and disclosed, and accordingly all suitable modifications and equivalents may be resorted to, falling within the scope thereof.

What is claimed is:

1. A computer-implemented method for map data output processing, comprising:
   extracting a plurality of map elements with area on the map data satisfying a predetermined condition from a map data storage unit storing the map data including the plurality of map elements;
   determining an output frame for each of the map elements with substantially the smallest size to cover one of the extracted map elements from a plurality of types of output frames that is defined to make up an entire available output area per page alone or in combination with a fixed scaling factor for all of the extracted map elements;
   clipping out map areas including the extracted map element corresponding to a size of the determined output frames from the map data stored in the map data storage unit; and
   generating output data by embedding the clipped-out map areas in the entire available output area per page, wherein
   each output frame has a point value associated therewith, and
   the generating operation comprises the operation of
   grouping the map elements corresponding to the determined output frames while adding up point values of the determined output frames so that the point values sum to a value associated with the entire available output area per page.

2. The method for map data output processing according to claim 1, further comprising:
   grouping those of the extracted map elements that are adjacent to each other and satisfy a predetermined condition,
   wherein the determining operation comprises the operation of
   determining an output frame covering the grouped map elements.

3. The method for map data output processing according to claim 2, wherein
   the grouping operation comprises the operation of
   storing size data about a minimum rectangular area covering the grouped map elements in the data storage unit in association with any one of the grouped map elements,
   the determining operation comprises:
   determining the size of the output frame of the minimum size covering the grouped map elements based on the size data stored in the data storage unit; and
   storing data representing the type of the determined output frame in the data storage unit in association with the map element corresponding to the output frame, and
   the clipping-out operation comprises the operation of
   reading out the data representing the type of the output frame associated with the map element stored in the data storage unit.

4. The method for map data output processing according to claim 1, wherein
   in the generating operation, the clipped-out map areas are embedded in the entire available output area per page in order of decreasing size of the corresponding output frames.

5. The method for map data output processing according to claim 1, further comprising:
   determining whether an area covering all the extracted map elements is within the entire available output area per page; and
   generating the area covering all the extracted map elements as the output data if it is determined that the area covering all the extracted map elements is within the entire available output area per page.

6. The method for map data output processing according to claim 1, wherein
   the determining operation comprises the operation of
   storing data representing the types of the determined output frames in the data storage unit in association with the map elements corresponding to the respective output frames, and
   the clipping-out operation comprises the operation of
   reading out the data representing the types of the output frames associated with the map elements stored in the data storage unit.

7. A computer-implemented method for map data output processing, comprising:
   extracting a plurality of map elements with area on the map data satisfying a predetermined condition from a map data storage unit storing the map data including the plurality of map elements;
   determining an output frame for each of the map elements with substantially the smallest size to cover one of the extracted map elements from a plurality of types of output frames that is defined to make up an entire available output area per page alone or in combination with a fixed scaling factor for all of the extracted map elements;
   grouping the map elements corresponding to the determined output frames in order of decreasing size of the output frames so that the output frames fit in an entire available output area per page; and
   generating output data by clipping out map areas including the extracted map elements corresponding to a size of the determined output frames from the map data stored in the map data storage unit and by combining the clipped-out map areas according to the grouping, wherein
   each output frame has a point value associated therewith, and
   the generating operation comprises the operation of
   grouping the map elements corresponding to the determined output frames while adding up point values of the determined output frames so that the point values sum to a value associated with the entire available output area per page.

8. The method of map data output processing according to claim 7, wherein
   the grouping operation comprises:
   storing data for identifying the map elements constituting each page in the data storage unit, and
   the generating operation comprises the operation of
   reading out the data for identifying the map elements constituting each page stored in the data storage unit and combining the clipped-out map areas.

9. A non-transitory computer-readable recording medium having stored therein a program that includes instruction to cause a computer to execute a method comprising:

extracting a plurality of map elements with area on the map data satisfying a predetermined condition from a map data storage unit storing the map data including the plurality of map elements;

determining an output frame for each of the map elements with substantially the smallest size to cover one of the extracted map elements from a plurality of types of output frames that is defined to make up an entire available output area per page alone or in combination with a fixed scaling factor for all of the extracted map elements;

clipping out map areas including the extracted map element corresponding to a size of the determined output frames from the map data stored in the map data storage unit;

generating output data by embedding the clipped-out map areas in the entire available output area per page; and grouping the map elements corresponding to the determined output frames while adding up point values of the determined output frames so that the point values sum to a value associated with the entire available output area per page, wherein each output frame has a point value associated therewith.

10. A non-transitory computer-readable recording medium having stored therein the program that includes instruction to cause a computer to execute a method comprising;

extracting a plurality of map elements with area on the map data satisfying a predetermined condition from a map data storage unit storing the map data including the plurality of map elements;

determining an output frame for each of the map elements with substantially the smallest size to cover one of the extracted map elements from a plurality of types of output frames that is defined to make up an entire available output area per page alone or in combination with a fixed scaling factor for all of the extracted map elements;

grouping the map elements corresponding to the determined output frames in order of decreasing size of the output frames so that the output frames fit in an entire available output area per page;

generating output data by clipping out map areas including the extracted map elements corresponding to a size of the determined output frames from the map data stored in the map data storage unit and by combining the clipped-out map areas according to the grouping; and adding up point values of the determined output frames so that the point values sum to a value associated with the entire available output area per page, wherein each output frame has a point value associated therewith.

11. An apparatus comprising:

a memory that stores map data including a plurality of map elements; and a processor that executes a procedure, the procedure comprising:

extracting the plurality of map elements with area on the map data satisfying a predetermined condition from a map data storage unit storing the map data including the plurality of map elements from the memory;

determining an output frame for each of the map elements with substantially the smallest size to cover one of the extracted map elements from a plurality of types of output frames that is defined to make up an entire available output area per page alone or in combination with a fixed scaling factor for all of the extracted map elements;

grouping the map elements corresponding to the determined output frames in order of decreasing size of the output frames so that the output frames fit in an entire available output area per page;

generating output data by clipping out map areas stored in the memory including the extracted map element corresponding to a size of the determined output frames from the map data stored in the map data storage unit and by combining the clipped-out map areas according to the grouping; and adding up point values of the determined output frames so that the point values sum to a value associated with the entire available output area per page, wherein each output frame has a point value associated therewith.

12. An apparatus comprising:

a memory that stores map data including a plurality of map elements; and a processor that executes a procedure, the procedure comprising:

extracting the plurality of map elements with area on the map data satisfying a predetermined condition from a map data storage unit storing the map data including the plurality of map elements from the memory;

determining an output frame for each of the map elements with substantially the smallest size to cover one of the extracted map elements from a plurality of types of output frames that is defined to make up an entire available output area per page alone or in combination with a fixed scaling factor for all of the extracted map elements;

grouping the map elements corresponding to the determined output frames in order of decreasing size of the output frames so that the output frames fit in an entire available output area per page;

generating output data by clipping out map areas stored in the memory including the extracted map elements corresponding to a size of the determined output frames from the map data stored in the map data storage unit and by combining the clipped-out map areas according to the grouping; and adding up point values of the determined output frames so that the point values sum to a value associated with the entire available output area per page, wherein each output frame has a point value associated therewith.

13. A computer-implemented method for map data output processing, comprising:

extracting map elements from map data with area on the map data;

determining a fixed scaling factor for the extracted map elements such that the extracted map elements are organized into output frames each corresponding to at least one of the extracted map elements and the output frames comprise an available output area per page;

outputting map corresponding to the determined output frames to the available output area per page; and grouping the map elements corresponding to the determined output frames while adding up point values of the determined output frames so that the point values sum to a value associated with the entire available output area per page, wherein each output frame has a point value associated therewith.

14. The method of claim 13, wherein the determining comprising grouping the map elements corresponding to the determined output frames in order of decreasing size of the output frames so that the output frames fit in the available output area per page.

15. A non-transitory computer-readable recording medium having stored therein a program that includes instruction to cause a computer to execute a method comprising:

extracting map elements from map data with area on the map data;

determining a fixed scaling factor for the extracted map elements such that the extracted map elements are organized into output frames each corresponding to at least one of the extracted map elements and the output frames comprise an available output area per page;

outputting map corresponding to the determined output frames to the available output area per page; and grouping the map elements corresponding to the determined output frames while adding up point values of the determined output frames so that the point values sum to a value associated with the entire available output area per page, wherein each output frame has a point value associated therewith.

16. The non-transitory computer-readable medium according to claim 15, wherein the determining comprising grouping the map elements corresponding to the determined output frames in order of decreasing size of the output frames so that the output frames fit in an entire available output area per page.

* * * * *

UNITED STATES PATENT AND TRADEMARK OFFICE
CERTIFICATE OF CORRECTION

| | | |
|---|---|---|
| PATENT NO. | : 8,355,158 B2 | Page 1 of 1 |
| APPLICATION NO. | : 11/896451 | |
| DATED | : January 15, 2013 | |
| INVENTOR(S) | : Mihoko Abe et al. | |

It is certified that error appears in the above-identified patent and that said Letters Patent is hereby corrected as shown below:

In the Claims:

Column 13, Line 29, In Claim 10, delete "comprising;" and insert -- comprising: --, therefor.

Signed and Sealed this
Fourth Day of June, 2013

Teresa Stanek Rea
*Acting Director of the United States Patent and Trademark Office*